United States Patent [19]
Fujii et al.

[11] 3,969,493
[45] July 13, 1976

[54] THERMOCHEMICAL PROCESS FOR MANUFACTURE OF HYDROGEN AND OXYGEN FROM WATER

[75] Inventors: Kinjiro Fujii, Komae; Wakichi Kondo, Kanagawa, both of Japan

[73] Assignee: Agency of Industrial Science & Technology, Tokyo, Japan

[22] Filed: June 20, 1975

[21] Appl. No.: 588,873

[30] Foreign Application Priority Data
June 21, 1974  Japan.............................. 49-70917

[52] U.S. Cl.............................. 423/579; 423/475; 423/481; 423/497; 423/507; 423/648
[51] Int. Cl.² ........................................ C01B 13/00
[58] Field of Search ........... 423/579, 648, 475, 497, 423/507, 481

[56] References Cited
UNITED STATES PATENTS

| | | | |
|---|---|---|---|
| 3,821,358 | 6/1974 | Interrante et al. | 423/579 |
| 3,839,550 | 10/1974 | Wentorf, Jr. | 423/579 |
| 3,842,164 | 10/1974 | Wentorf, Jr. | 423/579 |

*Primary Examiner*—Earl C. Thomas
*Attorney, Agent, or Firm*—Kurt Kelman

[57] ABSTRACT

Calcium hydroxide and iodine are reacted with each other in the presence of water to produce calcium iodate and calcium iodide, the former of which precipitates from the reaction solution and is obtained by filtration and the latter of which is thereafter separated from the filtrate by evaporation separation. The calcium iodate is heated until it is converted into calcium oxide, whereafter there ensues generation of a mixed gas of iodine and oxygen. The mixed gas is cooled causing the iodine component thereof to solidify and pure oxygen gas is consequently liberated to be obtained as one product. The calcium iodide is solidified and subsequently heated under a current of steam to cause it to undergo conversion into calcium oxide with liberation of hydrogen iodide gas. The hydrogen iodide gas thus liberated is then separated by a known method into iodine and hydrogen which is obtained as another product. The calcium oxide and iodine remaining after separation of oxygen and hydrogen are recycled to serve again as starting reactants.

6 Claims, 1 Drawing Figure

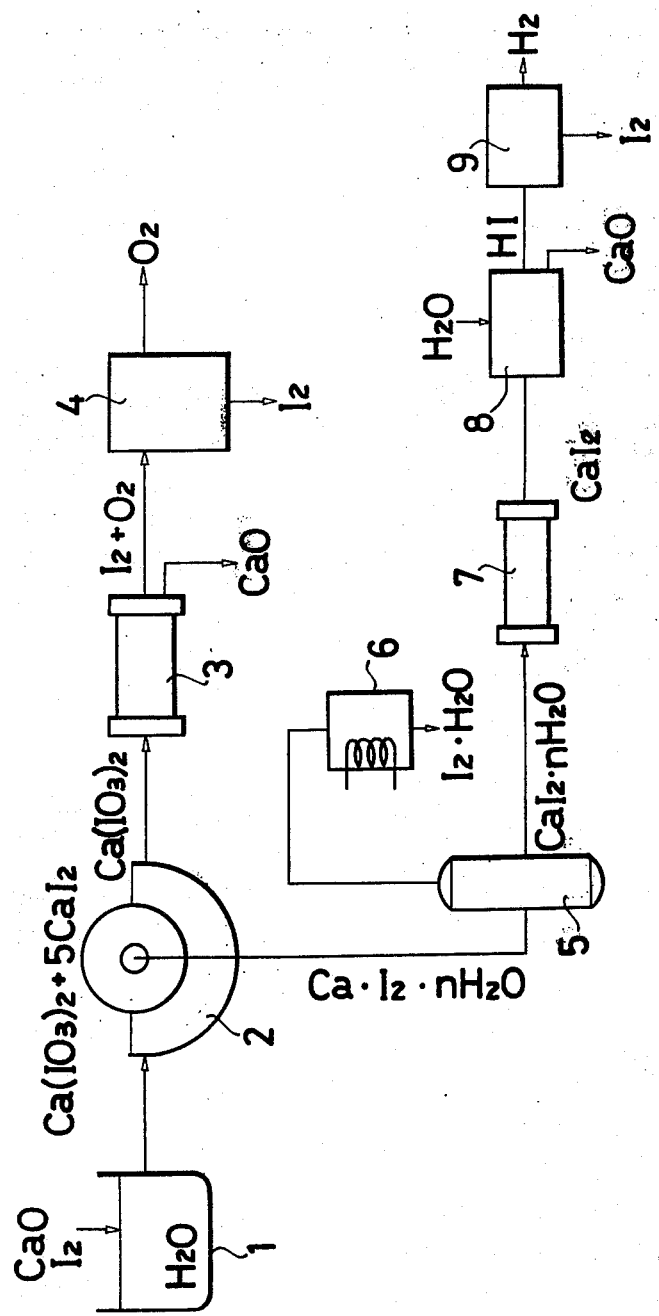

THERMOCHEMICAL PROCESS FOR MANUFACTURE OF HYDROGEN AND OXYGEN FROM WATER

BACKGROUND OF THE INVENTION

The present invention relates to a thermochemical process for the manufacture of hydrogen and oxygen from water.

A cycle for the production of hydrogen by virtue of the oxidation reaction of iodine has been suggested by Abraham and Schridnir [Science, 180 959 (1973)]. In this cycle, lithium nitrite is oxidized by iodine at about 27°C to produce lithium nitrate and hydrogen iodide, so that hydrogen iodide produces hydrogen through thermal dissociation and lithium nitrate produces oxygen through thermal decomposition respectively. The oxidation of lithium nitrite by iodine involved in this cycle, however, can hardly be described as proceeding smoothly. This utiliation of lithium, therefore, can hardly be called advantageous from the standpoint of natural resources.

An object of the present invention is to provide a thermochemical process for the manufacture of hydrogen and oxygen from water, said process being such that it involves only a few unit reactions which invariably proceed smoothly to give reaction products capable of being separated by easy operations.

Another object of this invention is to provide a thermochemical process for the manufacture of hydrogen and oxygen from water, said process being such that the process involves less consumption of thermal energy than the conventional method and, therefore, proves advantageous from the economical point of view.

SUMMARY OF THE INVENTION

To accomplish the aforementioned objects, the present invention provides a process which comprises the steps of allowing iodine and calcium hydroxide to react with each other in the presence of water at 20° to 100°C, separating calcium iodate and calcium iodide from the resultant reaction product, heating calcium iodate until it is converted into calcium oxide for thereby generating a mixed gas of iodine and oxygen, cooling the generated mixed gas thereby allowing the iodine component thereof to be educed in the form of crystals and simultaneously effecting liberation of oxygen gas therefrom, causing calcium iodide to react with steam at 400° to 750°C to give rise to hydrogen iodine and decomposing the generated hydrogen iodide into hydrogen and iodine. Thus, the number of unit reactions involved therein is small and the individual reactions require absolutely no harsh conditions. Thus, the reactions proceed smoothly and the separation and recovery of oxygen gas and hydrogen gas from the reaction products are accomplished with ease. Further since the iodine and calcium oxide remaining in the reaction system can be recycled for further use in this process, it is water alone that is actually consumed in the whole course of the process. The process proves advantageous also in this respect. In all the unit reactions of the process of this invention, the highest temperature at which any heating is performed at all is about 800°C. If barium is used, all the reactions can be carried out satisfactorily at temperatures lower than 700°C. It is only in the stage of recovery of calcium iodide from the filtrate that a heavy consumption of thermal energy is involved. Even in this stage, the concentration of the filtrate can be increased to an extremely high level in the case of this process. Accordingly, the energy consumption involved in this process is notably small as compared with that involved in the conventional process for the manufacture of oxygen and hydrogen from water.

Other objects and other characteristic features of the present invention will become apparent from the description to be given in further detail herein below with reference to the accompanying drawing.

BRIEF EXPLANATION OF THE DRAWING

The drawing represents a flow sheet illustrating one preferred embodiment of the process of this invention.

DETAILED DESCRIPTION OF THE INVENTION

The thermochemical process for the manufacture of hydrogen from water is underlain by a principle that in several chemical reactions involved therein which are effected by virtue of thermal energy, all the substances participating in said reactions are invariably recycled with the exception of water so as to have water eventually separated into hydrogen and oxygen.

The inventors pursued a study in search for a method whereby hydrogen and oxygen are thermochemically produced from water by virtue of the redox reaction of iodine. They have, consequently, discovered that by use of iodine and calcium or barium hydroxide, the unit reactions involved invariably proceed more safely with higher operational ease than those involved in the conventional process using iodine and lithium nitrate and that the iodine and calcium (or barium) oxide remaining after recovery of oxygen and hydrogen can be recycled to the reaction system for further use in the process. The present invention has been accomplished on the basis of this discovery. To be specific, the process of the present invention comprises the four unit reactions indicated below to produce hydrogen and oxygen from water while having iodine and calcium oxide recycled through the reaction system.

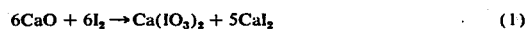
$$6CaO + 6I_2 \rightarrow Ca(IO_3)_2 + 5CaI_2 \qquad (1)$$

$$Ca(IO_3)_2 \rightarrow CaO + I_2 + 2.5O_2 \qquad (2)$$

$$5CaI_2 + 5H_2O \rightarrow 5CaO + 10HI \qquad (3)$$

$$10HI \rightarrow 5H_2 + 5I_2 \qquad (4)$$

First, iodine and calcium oxide are mixed in the presence of water and the resultant mixture is heated with simultaneous agitation to about 20° to 100°C. Consequently, there ensues a reaction of the formula (1) to produce calcium iodate ($Ca(IO_3)_2$) and calcium iodide ($CaI_2$). The former compound is rather sparingly soluble in water and, therefore, settles to the bottom of the reaction mixture. The latter compound is readily soluble in water and remains suspended in the reaction mixture. The two compounds, therefore, can easily be separated as by filtration, for example. In the reaction described above, the produced calcium iodide is separated and recovered by a process of evaporation, as will be described afterward, from the reaction mixture. In this connection, the amount of thermal energy to be consumed in the process of evaporation decreases with the increasing concentration of said compound in the mixture. If iodine and calcium hydroxide are subjected to said reaction at high concentration satisfying their stoichiometric proportion so that the concentration of the produced calcium iodide in the resultant mixture exceeds 35% (at 90°C), then undesirable substances such as $3Ca(OH)_2$, $CaI_2$ and $Ca(IO_3)_2·3~4H_2O$ are by-produced in the mixture. As these substances precipitate in solid phase, it becomes more difficult to recover calcium iodide from the mixture in proportion to the amount of these substances produced. When the reaction described above is carried out by using therein iodine in an excess amount of from 1.5 to 4 times as large as is stoichiometrically required on the basis of the amount of calcium oxide in use therefore, calcium iodate in the form of a precipitate and calcium iodide in the form of a solution having a concentration of from 50 to 60% can easily be obtained without giving rise to such by-products as mentioned above.

The calcium iodate separated in the form of a precipitate from the reaction mixture, when heated, begins to decompose as its temperature reaches about 550°C and, as indicated by the formula (2), generates a mixed gas of oxygen and iodine. While the heating is continued until about 800°C, the calcium iodate is converted into calcium oxide. When the generated mixed gas is cooled to normal room temperature, the iodine component thereof is educed in a solidified form and the oxygen gas can easily be separated and recovered. The iodine thus recovered in a solid form is recycled to the reaction system of the formula (1).

In the meantime, the calcium iodide contained in the filtrate is evaporated by an ordinary method into a solid state. When the solid calcium iodide is heated under the current of steam, it begins to undergo the reaction represented by the formula (3) with liberation of hydrogen iodide gas as the temperature reaches about 400°C. As the temperature further rises to 700°C, the amount of the gas generated increases sharply, with the result that calcium iodide is converted into calcium oxide. In this case, due precautions should be exercised not to supply steam excessively since, although an excessive supply of steam promotes reaction (3), it causes an increase in the amount of undecomposed HI in reaction (4) and further results in a considerable loss of energy. For the purpose of avoiding an excess of steam, it is possible to incorporate an inert gas into the steam which is en route to the reaction vessel. However, this is disadvantageous in that it causes a reduction in the concentration of the $H_2$ produced proportional to the amount of inert gas introduced. Consequently, it is preferable to employ a purely quantitative method whereby the supply of $H_2O$ is controlled relative to the amount of $CaI_2$. The hydrogen iodide gas generated as described above is subjected to the thermal dissociation expressed by the formula (4) and separated into iodine and hydrogen. The separation of hydrogen iodide into iodine and hydrogen can be effected by any of the known methods such as, for example, a method (Coehn and Sluckardt: Z. Phys. Chem. 91 725 (1916)) whereby the hydrogen iodide gas is introduced in a quartz reaction tube and irradiated by ultraviolet rays of a wavelength of about 2500 A. The calcium oxide finally remaining in the reaction system and the iodine remaining after separation of hydrogen are recycled to the reaction system of the formula (1) as starting reactants.

By the combination of the unit reactions of the formulas (1) through (4), the present invention can produce hydrogen and oxygen from water by use of thermal energy not exceeding 800°C and, furthermore, permits iodine and calcium oxide to be used cyclically through the process thereof without being consumed at all in the said unit reactions.

Now, one working example of the process of this invention will be described with reference to the attached flow sheet.

In the flow sheet, a reaction tank 1 containing water is charged with iodine and calcium oxide. The contents are now heated to about 90°C with simultaneous agitation, with the result that a precipitate occurs in the reaction solution. The reaction solution is forwarded to a filter 2 to be separated into the precipitate and the filtrate. The precipitate is heated to 800°C in a reaction tank 3. From the reaction tank 3 emanates a mixed gas of iodine and oxygen. This mixed gas is led into a cooling tank 4, wherein the mixed gas is cooled to normal room temperature so that the iodine gas is educed in a solidified state and the oxygen component is liberated in the form of a gas. In the reaction tank 3, there remains calcium oxide, which is returned to the reaction tank 1 in conjunction with said solid iodine.

The filtrate from the filter 2 is sent to an evaporator 5, wherein, the filtrate is evaporated. The vapor from this evaporation contains a fraction of iodine in addition to water and, therefore, is condensed in a condenser 6 and thereafter recycled to the reaction tank 1. The solid substance obtained in the evaporator 5 is further dried to hardness in a drier 7, subsequently forwarded to a reaction tank 8 and heated therein to 700°C by the introduction of a forced current of steam. Consequently, there is generated hydrogen iodide gas. This gas is separated into iodine and hydrogen by means of a known separation unit 9. The iodine thus separated and the calcium oxide remaining in the reaction tank 8 are recycled to the reaction tank 1. The iodine content of the $H_2$ and $O_2$ produced and separated by the above cycle can be reduced to several ppm by, for example, a gas purification process (not shown in the flow sheet) wherein the gas to be purified is passed through a shower of a liquid suspension of $Ca(OH)_2$. Thus, the purity of the produced $H_2$ and $O_2$ is nearly 100% even considering the small amounts of water vapor and air which find their way into the gases. Further the yield of oxygen is nearly 100% and that of hydrogen 75 to 95%.

The present invention obtains oxygen and hydrogen from water, as described above, in a closed system and, what is more, permits the iodine and calcium oxide which have participated in the reactions to be used cyclically in the process. The present invention has been described above with reference to an embodiment in which the thermochemical manufacture of hydrogen and oxygen from water is effected by use of iodine and calcium hydroxide. Now, another embodiment will be described wherein the manufacture of hydrogen and oxygen from water resorts to use of barium paraperiodate in addition to iodine and calcium hydroxide.

The solubility of calcium iodate ($Ca(IO_3)_2$) in water is 0.26 g/100 g $H_2O$ (at 20°C), whereas that of barium iodate is only 0.02 g/100 g $H_2O$, a value indicating far more sparing solubility of barium iodate. From this fact it is readily inferred that, when barium is used in place of calcium in the aforementioned reactions of the formulas (1) through (3), the iodate which is destined to generate oxygen mingles in a small amount into the liquid phase of iodide which is the source of hydrogen generation, namely, the mutual separability of said two compounds is improved and, as a consequence, the amounts of hydrogen and oxygen to be liberated increase proportionally. In actuality, however, barium iodide has so high thermal stability that the decomposition of steam involved in the reaction of the formula (3) proceeds only with much difficulty. The inventors, therefore, made a study on this problem. They have, consequently, discovered that, when the reactions are effected as indicated by the following formulas so that calcium is converted into its iodide and barium into its iodate respectively, the aforementioned difficulty is overcome and the desired production of hydrogen and oxygen from water can easily be accomplished.

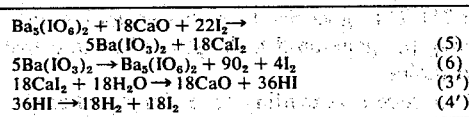
$$5Ba(IO_3)_2 + 18CaI_2 \tag{5}$$
$$5Ba(IO_3)_2 \rightarrow Ba_5(IO_6)_2 + 9O_2 + 4I_2 \tag{6}$$
$$18CaI_2 + 18H_2O \rightarrow 18CaO + 36HI \tag{3'}$$
$$36HI \rightarrow 18H_2 + 18I_2 \tag{4'}$$

When barium paraperiodate ($Ba_5(IO_6)_2$), calcium oxide and iodine are allowed to react with one another in the presence of water at about 150°C in accordance with the formula (5), there are produced barium iodate and calcium iodide. The former compound precipitates in the form of a monohydrate ($Ba(IO_3)_2 \cdot H_2O$) and the latter compound remains suspended in the reaction solution. The amount of barium ions dissolved in the liquid phase is very small.

In this case, since barium paraperiodate is sparingly soluble in water and shows a very slow reaction with iodine, the reaction of the formula (5) may be carried out in three split reactions as shown below.

First, excess iodine and barium paraperiodate are caused to react as indicated by the formula (7) in the presence of pressurized hot water.

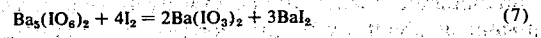

Then, lime is added into the resultant mixture, with the result that the ensuing reaction of the formula (8) produces calcium iodate temporarily.

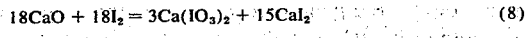

This calcium iodate immediately undergoes an ion-exchange reaction indicated by the following formula.

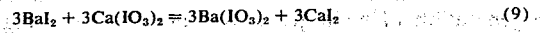

In this reaction, substantially all the barium ions are converted into barium iodate and precipitated.

The barium iodate separated as by filtration from the reaction solution, when heated, begins to generate a mixed gas of iodine and oxygen as the temperature reaches about 580°C. When heated at about 650°C, the barium iodate is converted into barium paraperiodate, which is recycled to the reaction system of the formula (5) so as to react again with calcium oxide and iodine in the presence of water. When the mixed gas of iodine and oxygen is cooled to normal room temperature, the iodine component is educed in a solidified form and the oxygen component can be separated and recovered in a gaseous form.

In the meantime, when the filtrate is deprived of water by evaporation, calcium iodate is obtained in a solid form. When this calcium iodate is heated to 400° to 750°C under the current of saturated steam, the reaction of the formula (3') ensues to cause generation of hydrogen iodide. As described above, hydrogen iodide is separated by a known method into iodine and hydrogen. The iodine thus separated is recycled to the reaction system of the formula (5).

Barium paraperiodate is thermally stable as compared with calcium salts and the like. When it is heated to the neighborhood of 900°C, however, it is eventually converted into barium oxide. In the course in which barium paraperiodate is converted into barium oxide, the composition of the solid phase is unstable. Even in this intermediate course, the solid reacts with iodine as readily as in the reaction of the formula (5) to produce the same product.

In the process of the present invention for the manufacture of hydrogen and oxygen from water, the unit reactions involved therein invariably proceed smoothly and the reaction products are separable by easy operations as described above. The heating is required to be given at 800°C where calcium alone is used. Where barium is additionally used, however, the reactions can be carried out satisfactorily at temperatures not exceeding 700°C. It is only in the stage of recovery of calcium iodide from the reaction solution that heavy consumption of thermal energy is required. The thermal energy requirement for the present invention is small as compared with that for the conventional method for the manufacture of hydrogen and oxygen from water. Thus, the process of this invention proves notably economical and promises high commercial feasibility.

EXAMPLE 1

In a glass reactor having an inner volume of 500 m/, 90g of iodine and 35g of water were placed. While the contents were heated with simultaneous agitation, 7.95g of calcium oxide was added thereto. Consequently, a precipitate occurred in the reaction mixture. The produced precipitate was calcium iodate ($Ca(IO_3)_2$) and could easily be separated by filtration from the reaction mixture. The yield of calcium iodate thus obtained was 9.0 g. When the filtrate was evaporated to dryness, there was obtained 34.0g of solid calcium iodide ($CaI_2$).

Then, 9g of calcium iodate was placed in a reaction tube lined with platinum and measuring 30 mm in diameter and 500mm in length and then heated under normal pressure by introducing a current of dry nitrogen gas at a flow rate of 0.2 l/min. As the temperature and reached about 570°C, generation of gas began to occur. Analysis by gas chromatography showed this gas to be a mixture of iodine gas and oxygen gas. When the reaction tube reached 800°C, the tube and contents were kept at this temperature for 30 minutes, while the generated mixed gas was cooled to room temperature. Consequently, the iodine component was precipitated in the form of purple crystals. This reaction produced 5.87g of iodine and 1.84g (about 1.3 liters) of oxygen gas. After their separation, the test tube contained 1.29g of residue was as practically wholly calcium oxide.

Separately, 34g of solid calcium iodide was mixed with twice as much in volume of alumina (having a particle diameter of about 0.5mm). The resultant mixture was placed in a quartz reaction tube lined with platinum and heated by passing therethrough a current of nitrogen gas containing saturated steam at 80°C at a flow rate of 30 ml/min. When the temperature rose to around 400°C, hydrogen iodide gas was generated to a visible extent. As the temperature reached 700°C, the amount of said gas generated increased sharply. When the generated gas was cooled suddenly to normal room temperature, about 75% of the generated hydrogen iodide was separated into hydrogen and iodine. Finally there were obtained about 2 liters (0.17g) of hydrogen gas, 22.1g of iodine and about 34g of a concentrated water solution containing 7.4g of undecomposed hydrogen iodide. In the test tube, there remained 6.45g of residue not including alumina. By X-ray analysis, this residue was found to be composed practically solely of calcium oxide. The calcium oxide, iodine and undecomposed hydrogen iodide which remained after separation of oxygen gas and hydrogen gas were recycled to the first-step reaction system.

EXAMPLE 2

In a reaction tube lined with platinum, 10g of barium iodate monohydrate ($Ba(IO_3)_2 \cdot H_2O$) was placed and heated. When the temperature rose to around 580°C, there began to occur generation of a mixed gas consisting of iodine and oxygen. After the tube contents had been maintained at 650°C for 30 minutes, the amount of the residue remaining therein decreased to about 4.5g. By X-ray analysis, the residue was found to be barium paraperiodate ($Ba_5(IO_6)_2$). When the mixed gas was suddenly cooled to room temperature, the iodine component thereof solidified and the oxygen could be separated consequently. Thus were obtained 4.0g of iodine and 1.1g (about 0.82 liters) of oxygen gas.

In conjunction with 5.91g of calcium hydroxide, 24.8g of iodine and 50g of water, 5g of said barium paraperiodate was placed in a reactor and subjected to a hydrothermal treatment at 150°C for 2 hours. Consequently, 11.1g of barium iodate monohydrate was produced in the form of bottoms and barium ions were dissolved in a very small amount in the liquid phase. When the bottoms were separated from the reaction mixture and then evaporated to dryness, there was obtained about 23g of calcium iodide. The calcium iodide thus obtained was mixed with twice as much in volume of alumina as in Example 1. The resultant mixture was placed to fill a reaction tube and heated by passing therethrough nitrogen gas containing saturated steam. When the temperature rose to around 400°C, there began to occur generation of hydrogen iodide gas. When the generated gas was suddenly cooled to normal room temperature, about 75% of the gas was decomposed to produce 15g of iodine and about 1.4 liters (0.115g) of hydrogen gas.

What is claimed is:

1. A process for the manufacture of hydrogen and oxygen from water, which process comprises the steps of allowing iodine and calcium hydroxide to react with each other in the presence of water at 20° to 100°C, separating calcium iodate and calcium iodide from the resultant reaction product, heating calcium iodate until it is converted into calcium oxide for thereby generating a mixed gas of iodine and oxygen, cooling the generated mixed gas thereby allowing the iodine component thereof to be educed in the form of crystals and simultaneously effecting liberation of oxygen gas therefrom, causing calcium iodide to react with steam at 400° to 750°C to give rise to hydrogen iodide and decomposing the generated hydrogen iodide into hydrogen and iodine.

2. The process according to claim 1, wherein the iodine is added in an excess amount of from two to four times as large as that stoichiometrically required on the basis of the amount of calcium oxide in use.

3. The process according to claim 1, wherein the calcium iodate is heated at 700° to 800°C.

4. The process according to claim 1, wherein the calcium iodate and steam are added to each other for the purpose of reaction in amounts satisfying a proportion such that the reaction proceeds in a state permitting the generated hydrogen iodide to undergo dissociation.

5. The process according to claim 1, wherein the calcium and iodine remaining after separation of hydrogen and oxygen are cyclically used as the starting reactants.

6. A process for the manufacture of hydrogen and oxygen from water, which process comprises the steps of allowing barium paraperiodate, calcium hydroxide and iodine to react with one another in the presence of water at about 150°C for thereby converting barium paraperiodate into barium iodate and calcium hydroxide into calcium iodide respectively, heating barium iodate until it is converted into barium paraperiodate for thereby generating a mixed gas of iodine and oxygen, cooling the generated mixed gas thereby allowing the iodine component thereof to be educed in a solid form and simultaneously effecting liberation of the oxygen component in a gaseous form, causing calcium iodide to react with steam at 400° to 750°C to cause generation of hydrogen iodide and decomposing the generated hydrogen iodide into hydrogen and iodine.

* * * * *